(12) United States Patent
Salter et al.

(10) Patent No.: US 10,946,839 B2
(45) Date of Patent: Mar. 16, 2021

(54) WHEEL WELL HEATER AND HEATING METHOD

(71) Applicant: Ford Global Technologies, LLC, Dearborn, MI (US)

(72) Inventors: Stuart C. Salter, White Lake, MI (US); Paul Kenneth Dellock, Northville, MI (US); Annette Huebner, White Lake, MI (US); Pietro Buttolo, Dearborn Heights, MI (US); David Brian Glickman, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 241 days.

(21) Appl. No.: 15/949,461

(22) Filed: Apr. 10, 2018

(65) Prior Publication Data

US 2019/0308591 A1 Oct. 10, 2019

(51) Int. Cl.
*B60S 1/68* (2006.01)
*H05B 3/14* (2006.01)
(Continued)

(52) U.S. Cl.
CPC ............ *B60S 1/68* (2013.01); *B29C 48/0017* (2019.02); *B29C 48/21* (2019.02); *B32B 27/20* (2013.01); *B32B 27/36* (2013.01); *H05B 3/145* (2013.01); *H05B 3/36* (2013.01); *B29K 2067/00* (2013.01); *B29K 2507/04* (2013.01); *B29L 2031/30* (2013.01); *B32B 2255/10* (2013.01); *B32B 2313/04* (2013.01); *B32B 2605/00* (2013.01);
(Continued)

(58) Field of Classification Search
CPC ... B60S 1/66; B60S 1/68; B62D 25/15; B62D 25/18; B60L 1/02; B29K 2067/00; B29K 2507/02; B29C 48/21; B29C 48/0017; H05B 2214/02; H05B 1/0236; H05B 3/342; H05B 3/36; H05B 3/34; H05B 3/345; H05B 3/347; H05B 3/145; H05B 2203/003; H05B 2203/014; H05B 2203/017; H05B 2203/013; H05B 2203/026; H05B 2203/004; B32B 27/20; B32B 27/36; B32B 2255/10; B32B 2313/04; B32B 2605/00; B29L 2031/30; B60R 16/033; B64D 15/12
See application file for complete search history.

(56) References Cited

U.S. PATENT DOCUMENTS 5,551,288 A  9/1996 Geraldi et al.
6,483,086 B1 11/2002 Wolff et al.
(Continued)

FOREIGN PATENT DOCUMENTS

CN 204472912 7/2015
JP 2011111018 6/2011

*Primary Examiner* — Shawntina T Fuqua
(74) *Attorney, Agent, or Firm* — David Coppiellie, Esq.; Carlson, Gaskey & Olds, P.C.

(57) ABSTRACT

An exemplary extruded heater assembly includes, among other things, a backing, a heating layer having a conductive ink printed on a film, and a wear layer. The heating layer is sandwiched between the backing and the wear layer. An exemplary method includes, among other things, extruding together a backing, a heating layer having a conductive ink printed on a film, and a wear layer to provide an extruded structure. The method further includes mounting the extruded structure within a wheel well of a vehicle.

20 Claims, 4 Drawing Sheets

(51) Int. Cl.

| | | |
|---|---|---|
| *B32B 27/36* | (2006.01) | |
| *B32B 27/20* | (2006.01) | |
| *H05B 3/36* | (2006.01) | |
| *B29C 48/00* | (2019.01) | |
| *B29C 48/21* | (2019.01) | |
| B29L 31/30 | (2006.01) | |
| B29K 67/00 | (2006.01) | |
| B29K 507/04 | (2006.01) | |

(52) U.S. Cl.
CPC .. *H05B 2203/013* (2013.01); *H05B 2203/017* (2013.01)

(56) References Cited

U.S. PATENT DOCUMENTS

| | | | |
|---|---|---|---|
| 2002/0096506 A1 | 7/2002 | Moreland et al. | |
| 2008/0083719 A1 | 4/2008 | Bartucco | |
| 2008/0296279 A1 | 12/2008 | Forrest et al. | |
| 2009/0051196 A1* | 2/2009 | Ishii | H05B 3/146 |
| | | | 297/180.12 |
| 2012/0193338 A1* | 8/2012 | Sullivan | H05B 3/56 |
| | | | 219/202 |
| 2014/0312027 A1* | 10/2014 | Augustine | A61F 7/007 |
| | | | 219/481 |
| 2015/0156819 A1* | 6/2015 | Kielar | H05B 3/20 |
| | | | 219/509 |
| 2015/0284031 A1* | 10/2015 | Lee | H05B 1/0236 |
| | | | 180/68.5 |
| 2016/0229460 A1 | 8/2016 | Kowalk | |

\* cited by examiner

WHEEL WELL HEATER AND HEATING METHOD

TECHNICAL FIELD

This disclosure relates generally to a heater assembly and heating method. More particularly, the disclosure relates to a heater assembly and heating method associated with a wheel well area of the vehicle. The heater assembly can be an extruded heater assembly.

BACKGROUND

In colder climates, meltable contaminants like ice and snow can periodically build up on a vehicle. Within wheel well areas of the vehicle, a sufficient buildup of the contaminants can lead to undesirable tire wear, body damage, or both. Vehicles with reduced clearances between the tires and the body can be particularly prone to such issues.

A user can manually remove a buildup of contaminants by, for example, kicking away the buildup from the wheel well. The manual removal, however, is not always timely. Also, certain vehicles, such as autonomous vehicles, may operate for long periods of time without interfacing with a user that is motivated to manually remove the buildup.

SUMMARY

An extruded heater assembly according to an exemplary aspect of the present disclosure includes, among other things, a backing, a heating layer having a conductive ink printed on a film, and a wear layer. The heating layer is sandwiched between the backing and the wear layer.

In another example of the foregoing heater assembly, the backing, the heating layer, and the wear layer are portions of a single extruded structure.

In another example of any of the foregoing heater assemblies, the single extruded structure is thermoformed into a shape corresponding to a wheel well.

Another example of any of the foregoing heater assemblies includes a vehicle. The backing is secured directly to a vehicle body of the vehicle such that the extruded heater assembly is disposed within a wheel well area and extends circumferentially about a portion of a wheel.

In another example of any of the foregoing heater assemblies, the backing includes an insulative layer and a thermally conductive layer. The thermally conductive layer is sandwiched between the insulative layer and the heating layer.

In another example of any of the foregoing heater assemblies, the insulative layer and the thermally conductive layer both comprise a polyester material.

In another example of any of the foregoing heater assemblies, the insulative layer comprises a glass additive, and the thermally conductive layer comprises both a carbon additive and a graphite additive.

In another example of any of the foregoing heater assemblies, the conductive ink printed on the film comprises a capacitive portion printed on the film that provides a portion of a capacitive circuit, and a heating portion printed on the film that provides a portion of a heating circuit.

In another example of any of the foregoing heater assemblies, the conductive ink is printed on a first side of the film, and the wear layer is disposed adjacent an opposite, second side of the film.

In another example of any of the foregoing heater assemblies, the heating layer projects laterally past both the backing and the wear layer.

A method accordingly to another exemplary aspect of the present disclosure includes, among other things, extruding together a backing, a heating layer having a conductive ink printed on a film, and a wear layer to provide an extruded structure. The method further includes mounting the extruded structure within a wheel well area of a vehicle.

In another example of the foregoing method, the heating layer is sandwiched between the backing and the wear layer.

Another example of any of the foregoing methods includes thermoforming the extruded structure prior to the mounting.

In another example of any of the foregoing methods, the thermoforming includes shaping the extruded structure about a mold to establish a contour within the extruded structure. The contour corresponds to a shape of the wheel well area.

Another example of any of the foregoing methods includes activating the conductive ink to heat the wheel well area.

Another example of any of the foregoing methods includes activating some of the conductive ink within a first circuit to heat the wheel well area and activating some of the conductive ink within a second circuit to detect a buildup of contaminants in the wheel well area.

Another example of any of the foregoing methods includes printing the conductive ink on a first side of the film, and extruding the wear layer adjacent an opposite, second side of the film.

In another example of any of the foregoing methods, a portion of the heating layer projects laterally past both the backing and the wear layer.

Another example of any of the foregoing methods includes electrically connecting a power supply to the portion of the heating layer.

In another example of any of the foregoing methods, the vehicle is an electrified vehicle.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to heating a wheel well area of a vehicle. The heating can prevent a buildup of ice, snow, and other contaminants. An extruded heater assembly can be mounted within the wheel well area to provide the heating.

Figure 1:
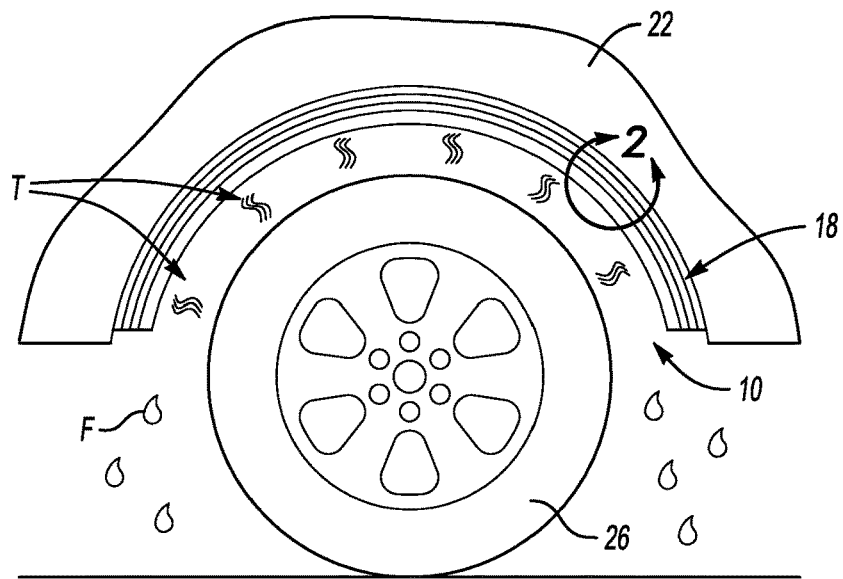
FIG. 1 illustrates an extruded heater assembly within a wheel well area of a vehicle according to an exemplary embodiment.

Referring to FIG. 1, a wheel well area 10 of a vehicle includes an extruded heater assembly 18 mounted to a vehicle body 22. The extruded heater assembly 18 extends circumferentially about a portion of a wheel 26 associated with the wheel well area 10. For purposes of this disclosure, the wheel well area 10 corresponds generally to the area between the wheel 26 and the vehicle body 22.

The extruded heater assembly 18 can be activated to generate thermal energy T, which increases a temperature within the wheel well area 10 to inhibit ice, snow, and other meltable contaminants from building up within the wheel well area 10. If such contaminants have already built up within the wheel well area 10, the extruded heater assembly 18 can be activated to melt away the buildup. The thermal energy T causes the meltable contaminants to transition into droplets of fluid F, which flow away from the wheel well area 10. Reducing, eliminating, or inhibiting a buildup of contaminants within the wheel well area 10 can help to maintain adequate clearances between the wheel 26 and the vehicle body 22 in the wheel well area 10.

Figure 2:
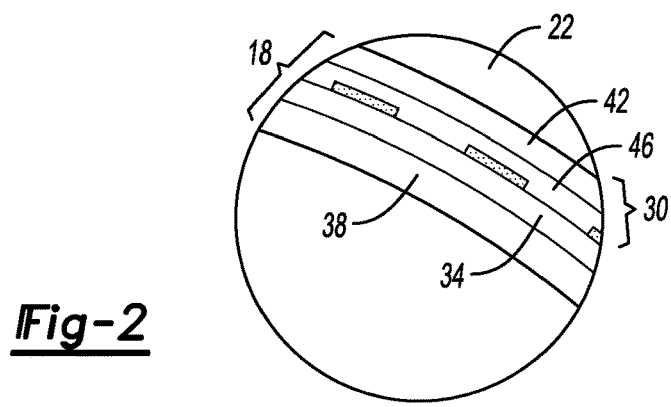
FIG. 2 illustrates the close-up view of Area 2 in FIG. 1.

With reference now to FIG. 2, the exemplary extruded heater assembly 18 includes a backing 30, a heating layer 34, and a wear layer 38. The heating layer 34 is sandwiched between the backing 30 and the wear layer 38. The backing 30, the heating layer 34, and the wear layer 38 are extruded together to provide a singular extruded structure in the form of the extruded heater assembly 18.

An extruded structure, such as the extruded heater assembly 18, is structurally distinguishable from an assembly that is not extruded, such as, for example, an injection molded structure. That is, a person having skill in this art could structurally differentiate an extruded structure from a non-extruded structure.

In the exemplary embodiment, the backing 30 is utilized to secure the extruded heater assembly 18 to the vehicle body 22. The wear layer 38 is exposed and faces outwardly away from the heating layer 34 and the backing 30.

During operation, the heating layer 34 is activated to generate thermal energy. The backing 30, in an exemplary non-limiting embodiment, includes an insulative layer 42 and a thermally conductive layer 46. The thermally conductive layer 46 helps to distribute thermal energy from the heating layer 34 circumferentially about the area of the wheel well area 10. The insulative layer 42 drives thermal energy generated by the heating layer 34 toward the wheel well area 10. The backing 30, in some examples, can provide an insulator for both electrical interference and sound.

Figure 3:
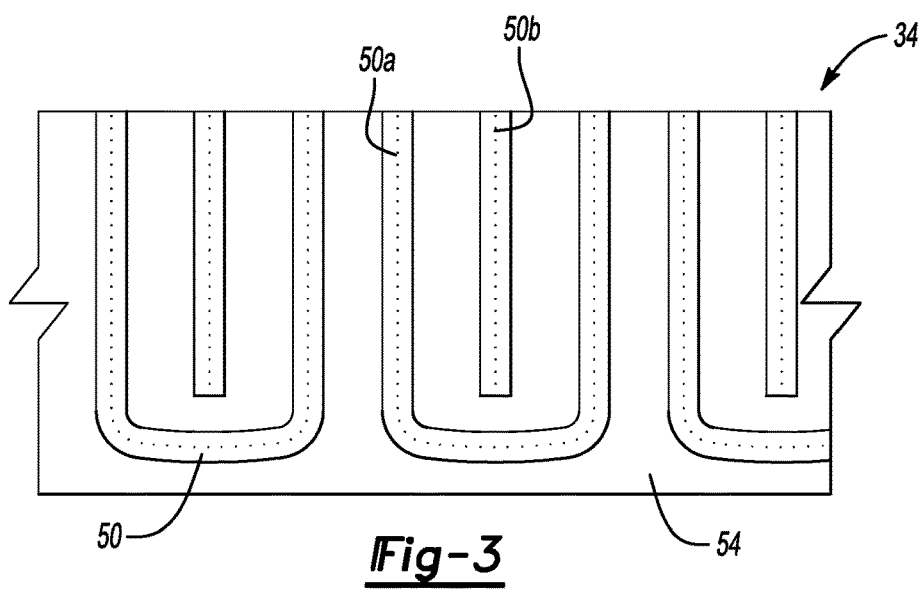
FIG. 3 illustrates a heating layer from the extruded heater assembly of FIG. 1.

Referring now to FIG. 3, the heating layer 34 includes a conductive ink 50 printed on a film 54. The conductive ink 50, in an exemplary embodiment, is a silver ink. The heating layer 34 generates thermal energy by activating the conductive ink 50. A person having skill in this art would understand how to print the conductive ink 50 on the film 54.

In the exemplary embodiment, the conductive ink 50 includes a heating portion 50A that can provide heat, and a capacitive portion 50B that can measure capacitance. During operation, the heating portion 50A can be used to generate thermal energy. The capacitive portion 50B can be part of a separate circuit that measures capacitance near the wheel well area 10. Measurements of the capacitance can help to establish an amount of ice, snow, and contaminant buildup within the wheel well area 10. The capacitance can change in response to an amount of buildup within the wheel well area 10.

The film 54 is, in an exemplary embodiment, five millimeters or less in thickness. The conductive ink 50 is printed on a side of the film interfacing with the thermally conductive layer 46. An opposing, second side of the film 54, interfaces with the wear layer 38.

The film 54 is substantially a carrier for the conductive ink 50. The film 54 holds a position of the conductive ink 50 during extrusion of the extruded heater assembly 18. The film 54 can be a thermoplastic material, such as Polyether ether ketone (PEEK). An example of such a material is available under the tradename VICTREX® PEEK 90P.

The wear layer 38 is exposed and faces the wheel 26. The wear layer 38 can help to protect the extruded heater assembly 18 from damage. Even if the wear layer 38 chips or cracks, the conductive ink 50 is not immediately exposed due to the conductive ink 50 being positioned on a side of the film 54 opposite the wear layer 38.

Figure 4:
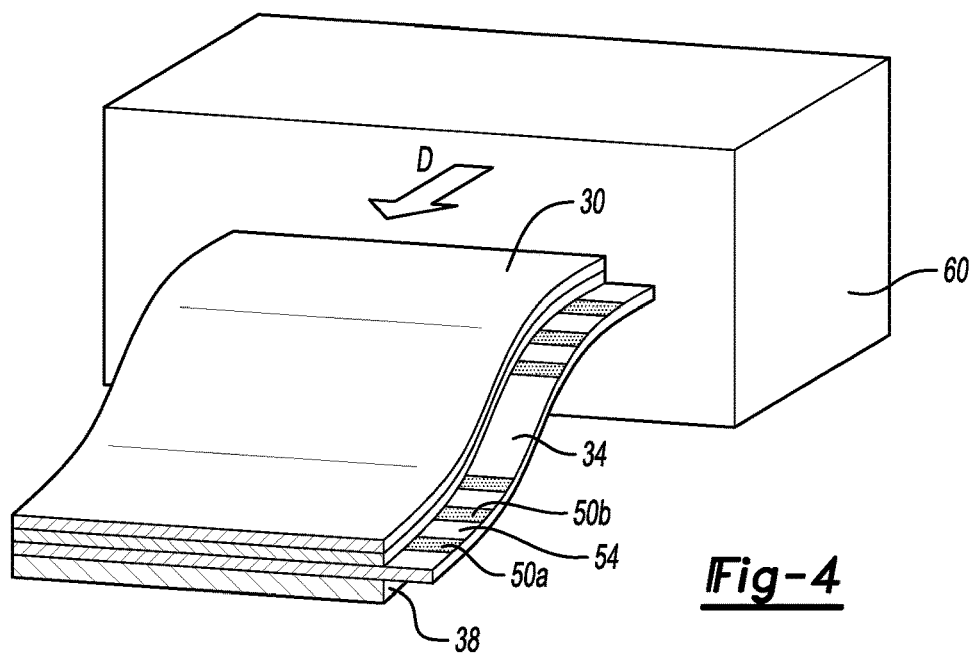
FIG. 4 illustrates an extrusion step in a process of forming the extruded heater assembly of FIG. 1.

Referring now to FIG. 4, a step in a process of forming the extruded heater assembly 18 of FIG. 1 includes extruding the backing 30 and the wear layer 38 in a direction D through an extrusion die 60. The insulative layer 42 and the thermally conductive layer 46 can, in some examples, extruded to be individually each less than 0.75 inches in thickness.

Figure 5:
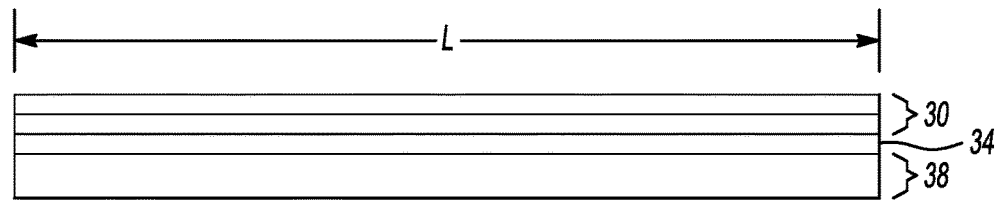
FIG. 5 illustrates a trimming step in the process of forming the extruded heater assembly of FIG. 1.

The heating layer 34 with the conductive ink 50 painted on the film 54 is sandwiched between the backing 30 and the wear layer 38 during the extruding. A trimming step then cuts the backing 30, the wear layer 38, and the heating layer 34 into a desired length L as shown in FIG. 5.

Figure 6:
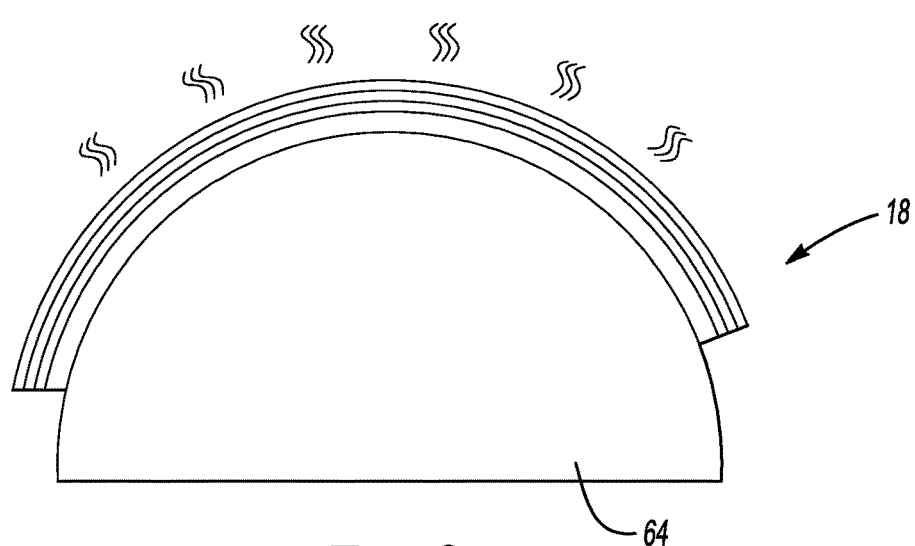
FIG. 6 illustrates a thermoforming step in the process of forming the extruded heater assembly of FIG. 1.

Next, as shown in FIG. 6, the extruded structure is thermoformed about a mold 64. The thermoforming generally establishes a contour within the extruded structure generally corresponding to a shape of the wheel well area 10.

The materials of the extruded heater assembly 18 can be selected to facilitate extrusion and thermoforming.

For example, a material composition of the insulative layer 42 can include a modified recycled polymer of the polyester family, such as recycled polyethylene terephthalate (PET) derived from recycled water bottles and soda bottles. Recycled PET can be used due to, among other things, recycled PET having a relatively high melt point of 250 degrees Celsius, a heat deflection temperature of 115 degrees Celsius (when unfilled), and a working temperature of 170 degrees Celsius. At least the working temperature of recycled PET is significantly higher than polyethylene, which is about 60 degrees Celsius, and polypropylene, which is about 90 degrees Celsius. The higher working temperature can facilitate thermoforming.

Recycled PET, however, can be brittle can lack the elongation for thermoforming into the contour of the wheel well area 10. Accordingly, the PET can be modified to include additives.

In a non-limiting embodiment, a material composition of the insulative layer includes 65 percent-by-weight recycled PET, 5 percent-by-weight terpolymer, 15 percent-by-weight compatibilizer, 5 percent-by-weight glass, and 10 percent-by-weight plasticizer.

The terpolymer can act as a toughener to improve the impact strength of the insulative layer 42. The terpolymer can be, for example, a terpolymer available under the tradename OTADER® AX8900, which is a random terpolymer of ethylene, acrylic ester and glycidyl methacrylate.

The compatibilizer can facilitate flexibility and elongation of the insulative layer 42. The compatibilizer can be a compatibilizer available under the tradename LOTRYL® 24 MA005, which is a random copolymer of Ethylene and Methyl Acrylate produced by high-pressure radicular polymerization process.

The glass can be hollow glass spheres, which can reduce both density and thermal transmission of the insulative layer 42.

The plasticizer can be dioctyl terephthalate (DOTP), which can facilitate flexibility and toughness of the insulative layer 42.

As to the thermally conductive layer 46 of the backing 30, the material composition can also, primarily, include recycled PET. In a specific non-limiting embodiment, a material composition of the thermally conductive layer includes 65 percent-by-weight recycled PET, 5 percent-by-weight terpolymer, 15 percent-by-weight compatibilizer, 10 percent-by-weight plasticizer, 3 percent-by-weight graphite, and 2 percent-by-weight carbon.

The terpolymer can be a terpolymer available under the tradename OTADER® AX8900, which is a random terpolymer of ethylene, acrylic ester and glycidyl methacrylate. The terpolymer can act as a toughener to improve the impact strength of the thermally conductive layer 46.

The compatibilizer can improve flexibility and elongation of the thermally conductive layer 46. The compatibilizer can be a compatibilizer available under the tradename LOTRYL® 24 MA005, which is a random copolymer of Ethylene and Methyl Acrylate produced by high-pres sure radicular polymerization process.

The plasticizer can be dioctyl terephthalate (DOTP), which can facilitate flexibility and toughness of the thermally conductive layer 46.

The graphite can be an expanded graphite, which can facilitate heat conduction within the thermally conductive layer 46.

The carbon can comprise multi-wall carbon nanotubes, which can facilitate heat conduction within the thermally conductive layer 46.

In another example, the insulative layer 42, the thermally conductive layer 46, or both, can include woven polypropylene. Thermoplastic olefin (TPO) with a filler such as nanotubes, glass balls, or basalt could instead, or additionally, be used.

The wear layer 38 can include low energy, thermal conductive materials. The material material composition of the wear layer 38 can comprise a thermoplastic, such as Polyaryletherketone (PAEK). An example of such a material is available under the tradename VICTREX® WG101. In some examples, a surface of the wear layer 38 facing the wheel well area 10 is relatively smooth to discourage a buildup of meltable contaminants.

Figure 7:
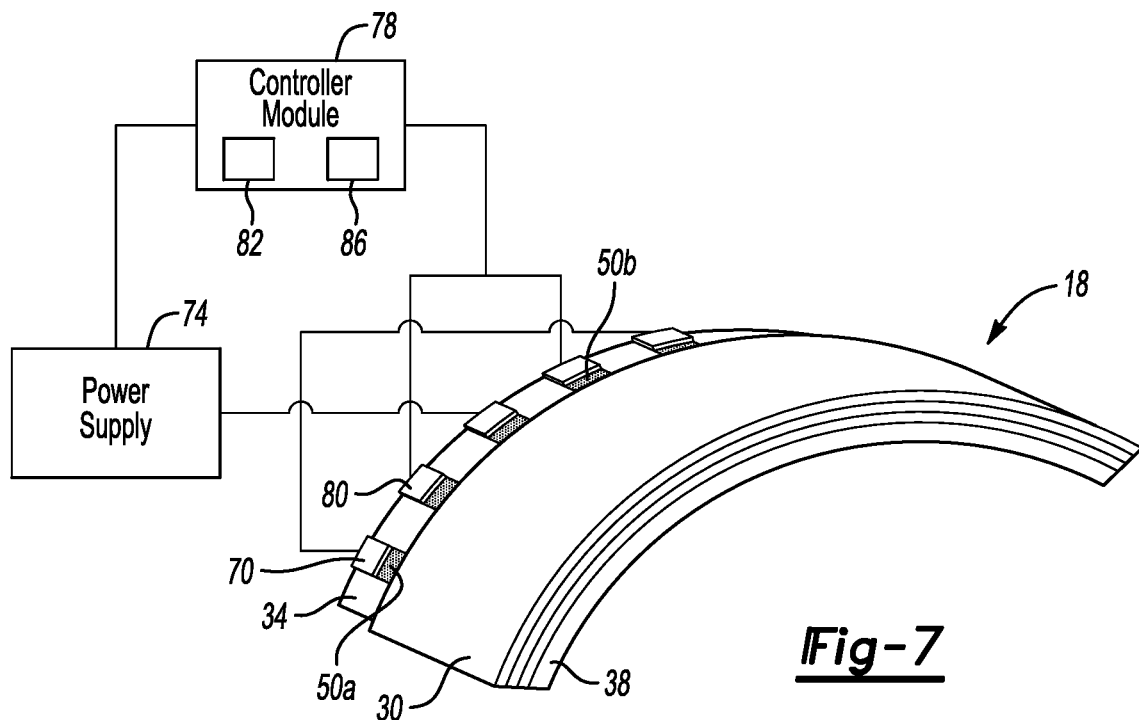
FIG. 7 illustrates a perspective view of the extruded heater assembly operably connected to a power supply and a controller module.

With reference now to FIG. 7, the extruded heater assembly 18 is extruded such that a portion of the heating layer 34 projects laterally past the backing 30 and the wear layer 38. Laterally is with reference to the direction D of extrusion (see FIG. 4).

When installed within a vehicle, clips 70 can connect to the conductive ink portions 50A to electrically couple the conductive ink portions 50A to a power supply 74, such as an accessory battery onboard the vehicle. The power supply 74 could instead be a traction battery, or a power source that is external to the vehicle. A controller module 78 can be operably connected to the power supply 74 to control activation of the conductive ink portions 50A.

The capacitive portions 50B can also be operably connected to the controller module 78 via clips 80. The capacitive measurements can pass from the capacitive portions 50B to the controller module 78. Based on these measurements, the controller module 78 can assess an amount of buildup within the wheel well area 10.

In some examples, the capacitive measurements can help the controller module 78 to identify particular contaminants (e.g., rain, snow, ice) within the wheel well area 10, as well an amount of the contaminants.

The controller module 78 can control the heating of the wheel well area 10 using the extruded heater assembly 18 according to various methods. The controller module 78, in this exemplary embodiment, includes a processor 82 and a memory portion 86. The controller module 78 can be a stand-alone controller or incorporated into a controller module such as an engine control unit (ECU) or powertrain control module (PCM). Although shown as a single hardware device, the controller module 78 could include multiple controller modules in the form of multiple hardware devices, or multiple software controllers within one or more hardware devices. At least some portions of the controller module 78 could, in some examples, be located remote from the vehicle.

The processor 82 can be programmed to execute a program stored in the memory portion 86. The processor 82 can be a custom made or commercially available processor, a central processing unit (CPU), an auxiliary processor among several processors associated with the controller module 78, a semiconductor based microprocessor (in the form of a microchip or chip set) or generally any device for executing software instructions.

The program can be stored in the memory portion 86 as software code. The memory portion 86 can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the controller module 78 can also have a distributed architecture, where various components are situated remotely from one another, but the memory portion 86 can be accessed by the processor 82.

The program stored in the memory portion 86 can include one or more additional or separate programs, each of which includes an ordered listing of executable instructions for implementing logical functions associated with controlling the extruded heater assembly 18.

Figure 8:
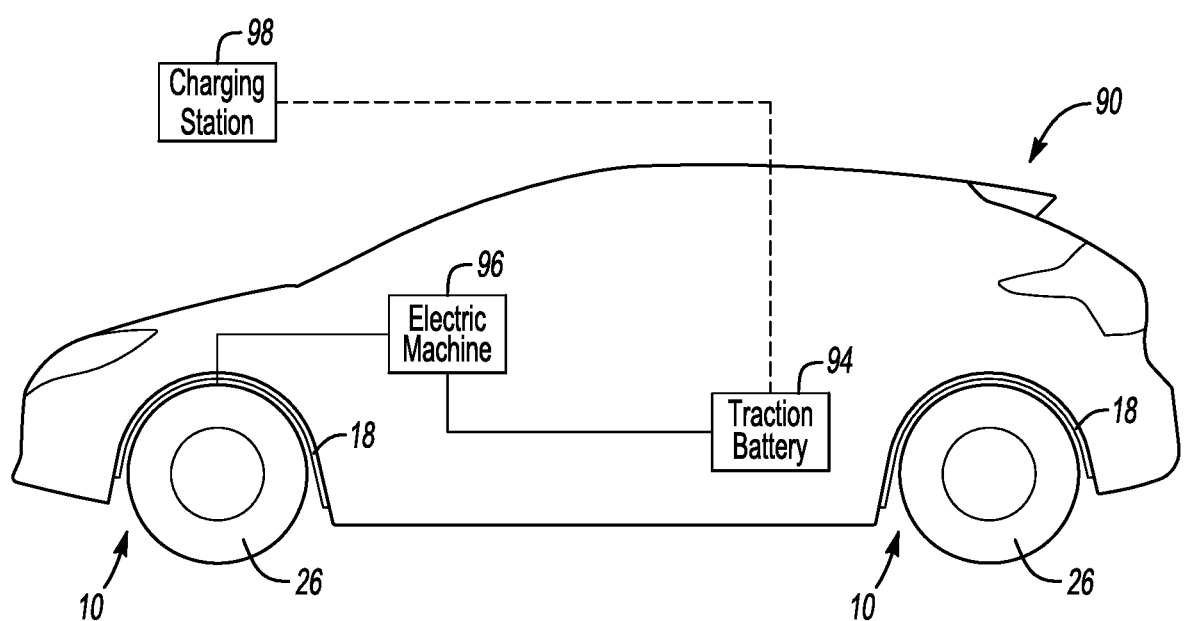
FIG. 8 illustrates an electrified vehicle incorporating the extruded heater assembly of FIG. 1 within a wheel well area of the electrified vehicle.

With reference to FIG. 8, the wheel well area 10 in an exemplary embodiment, is a wheel well area of an electrified vehicle 90 having a traction battery 94 and an electric machine 96. The example electrified vehicle 90 is a plug-in, all-electric vehicle.

Power from the traction battery 94 can be used to drive the electric machine 96. When powered, the electric machine 96 can generate torque to drive the wheel 26. The traction battery 94 is a relatively high-voltage traction battery pack.

Although depicted as an all-electric vehicle, it should be understood that the concepts described herein are not limited to all-electric vehicles and could extend to other types of electrified vehicles. The electrified vehicle 90 could be, for example, a hybrid electric vehicle, which can selectively drive the wheel 26 with torque provided by an internal combustion engine instead of, or in addition to, the electric machine. Other electrified vehicles could include, but not limited to, plug-in hybrid electric vehicles (PHEVs), battery electric vehicles (BEVs), and fuel cell vehicles. In still other examples, the electrified vehicle 90 could instead be a non-electric (i.e., conventional) vehicle.

The traction battery 94 can be recharged by, for example, electrically coupling the traction battery 94 to an external power source, such as a grid source of power at a charging station 98 that is external to the electrified vehicle 90. Charging the traction battery 94 could involve engaging a charge port of the electrified vehicle 90 with a charger of the charging station 98. Power can then flow from the charging station 98, through the charger, to the traction battery 94.

The charging station 98 is a type of Electric Vehicle Supply Equipment (EVSE). Other types of EVSE could be used to charge the traction battery 94 in other examples. For example, the external power source could be a road enhanced with inductive charging capability. As the electrified vehicle 90 is driven over the road, the traction battery 94 can be inductively charged.

Figure 9:
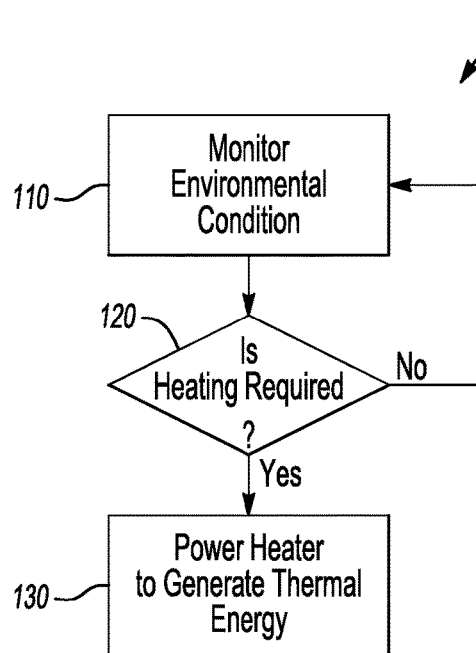
FIG. 9 illustrates the flow of a method of controlling the extruded heater assembly to heat the wheel well area of the electrified vehicle of FIG. 8 according to an exemplary embodiment of the present disclosure.

With reference to FIGS. 7-9, an exemplary control method 100 for the extruded heater assembly 18 when used in connection with the electrified vehicle 90 begins, in this example, at a step 110 when the electrified vehicle 90 is charging with power from charging station 98, which, again, is a power source that is external to the electrified vehicle 90.

At the step 110, the method 100 monitors an environmental condition, such as a temperature of the wheel well area 10. Other environmental conditions could instead, or additionally, include a moisture level, a buildup of meltable contaminants within the wheel well area 10, or some combination of these. Vehicle sensors or other sensors could be used to detect environmental conditions that are monitored in the step 110.

The environmental condition is assessed then by the controller module 78 at a step 120. If the assessment indicates that heating the wheel well area 10 is desired, the method 100 moves to a step 130. If the assessment indicates that heat the wheel well area 10 is not desired, the method 100 continues to monitor the environmental condition.

The assessment at the step 120 can include a detected temperature being at or below a threshold temperature. The threshold temperature could be, for example, 0 degrees Celsius. A temperature of the wheel well area 10 at or below freezing can be a condition appropriate for meltable contaminants to build up within the wheel well area 10.

At the step 130, the method 100 generates thermal energy from the extruded heater assembly 18 to heat the wheel well area 10. The power for the generating is drawn from the charging station 98. The extruded heater assembly 18 is thus powered from a source that is external to the vehicle, such as a grid source of power that is used during charging.

Heating the wheel well area 10 can remove meltable contaminants, and can inhibit meltable contaminants from building up in the wheel well area 10 when the electrified vehicle 90 is driven away after charging. The heating essentially preheats the wheel well area 10 to discourage meltable contaminants from building up within the wheel well area 10.

In exemplary method 100, the heating layer 34 of the extruded heater assembly 18 is activated to heat the wheel well area 10. Other examples could include other types of heaters.

Figure 10:
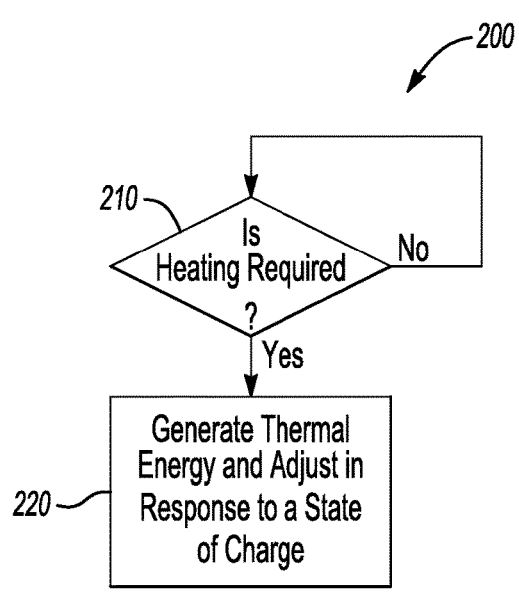
FIG. 10 illustrates the flow of a method of controlling the extruded heater assembly to heat the wheel well area of the electrified vehicle of FIG. 8 according to another exemplary embodiment of the present disclosure.

With reference to FIGS. 7, 8, and 10, another exemplary control method 200 for the extruded heater assembly 18 when used in connection with the electrified vehicle 90 begins, in this example, at a step 210 when the electrified vehicle 90 is not being charged by an external power source, such as the charging station 98. The step 210 could occur when the electrified vehicle 90 is driven and moving, for example.

At the step 210, the method 200 assesses whether heating the wheel well area 10 is desired. The assessment in the step 210 could be based on an environmental condition. The assessment in the step 210 could instead, or additionally, be based on a command from a user, such as a driver of the electrified vehicle 90 commanding the heating to begin. The assessment in the step 210 could instead, or additionally, be based a proximity of the electrified vehicle 90 to an external power source, such as the charging station 98, that can be used to recharge the traction battery 94.

Example environmental conditions used during the assessment in the step 210 could include an amount of meltable contaminants within the wheel well area 10, which could be detected by a capacitive sensor like the capacitive portion 50B of the conductive ink 50.

If the step 210 assesses that heating the wheel well area 10 is desired, the method 200 moves to a step 220 where the extruded heater assembly 18 generates thermal energy to heat the wheel well area 10. The generating is adjusted in response to a state of charge of a power supply of the electrified vehicle 90, such as a state of charge of the traction battery 94.

The adjusting of the generating ensures that the power used to power the extruded heater assembly 18 will not cause the state of charge to fall below a threshold amount, such as an amount of power required to drive the electrified vehicle to the charging station 98.

In the exemplary method 200, the heating layer 34 of the extruded heater assembly 18 is activated to heat the wheel well area 10. Other examples could include other types of heaters.

Figure 11:
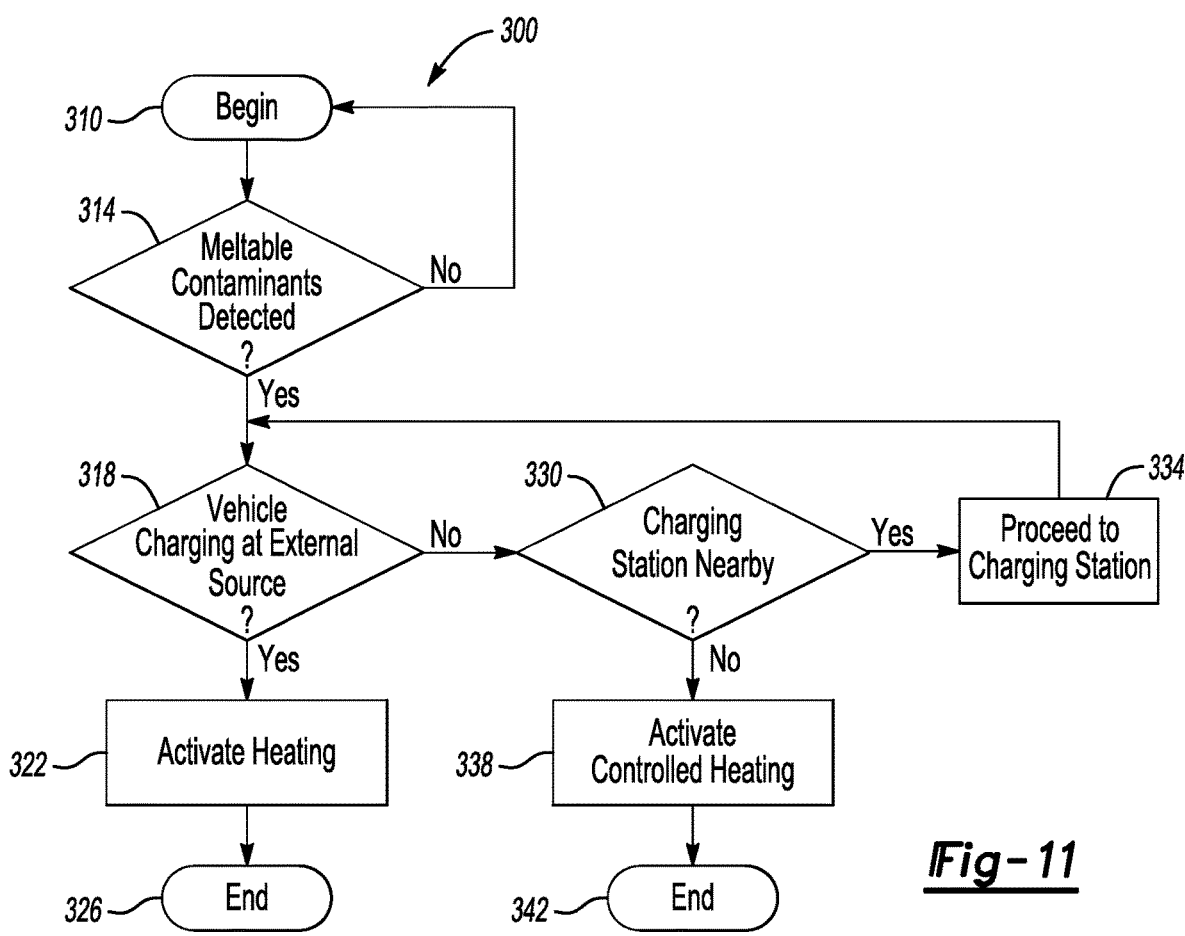
FIG. 11 illustrates the flow of a method of controlling the extruded heater assembly to heat the wheel well area of the electrified vehicle of FIG. 8 according to still another exemplary embodiment.

With reference to FIGS. 7, 8, and 11, another exemplary control method 300 for the extruded heater assembly 18 when used in connection with the electrified vehicle 90 begins, in this example, at a step 310

Next, at a detecting step 314, the method 100 detects whether or not meltable contaminants are within the wheel well area 10. The detecting step 314 can rely on temperature data received from one or more temperature sensors on the vehicle or elsewhere. The temperature data can be used by the controller module 78 to assess whether or not the temperature of the wheel well area 10 is conducive to contaminants, like ice, building up within the wheel well area 10. For example, the controller module 78 can calculate that ice building up in the wheel well area 10 is more likely if the wheel well area 10 has a temperature that is at or below 0 degrees Celsius, and less likely if the wheel well area 10 has a temperature that is above 0 degrees Celsius.

The detecting step 314 could additionally receive moisture data received from one or more moisture sensors on the vehicle or elsewhere, such as a windshield moisture sensor. The moisture data can be used by the controller module 78 to assess whether or not the moisture conditions of are conducive to contaminants, like ice, building up within the wheel well area 10. For example, the controller module 78 calculates that ice building up in the wheel well area 10 is more likely if the windshield moisture sensor detects significant moisture in the area of the electrified vehicle 90.

The detecting step 314 could additionally receive capacitance data from the capacitive portion 50B of the conductive ink 50 of the heating layer 34. In such an example, the capacitive portion 50B acts as a capacitive sensor. The capacitance data can be used by the controller module 78 to assess whether or not the contaminants, like ice, have built up within the wheel well area 10. The capacitance data can, in some examples, reveal an amount of contaminant build up, a type of the contaminant, or both. For example, when liquid water is within the wheel well area 10 due to rain, the capacitance data can be a signal that oscillates over a relatively wide range. The oscillations of the signal over the relatively wide range are interpreted by the controller module 78 as a rain signal pattern. Thus, no heating to remove contaminants is required. If the capacitance data is instead a signal that is relatively stable, and a temperature in the wheel well area 10 is at or below 0 degrees Celsius, the controller module 78 interprets the signal as an ice pattern signal. Thus, heating to remove contaminants may be desired.

If, after the detecting step 314, no meltable contaminants are detected within the wheel well area 10, the method moves back to the step 310. If, after the detecting step 314, meltable contaminants are detected, the method moves to a step 318 where the controller module 78 assesses whether or not the electrified vehicle 90 is charging from an external power source outside the electrified vehicle 90, such as the charging station 98.

If the electrified vehicle 90 is charging, the method 300 moves to a step 322, which activates the heating layer 34 of the extruded heater assembly 18 to heat the wheel well area 10. Since the electrified vehicle 90 is charging from the external power source, the power used by the heating layer 34 can be drawn from the external power source rather than a power source within the electrified vehicle 90. In some examples, the heating layer 34 is activated to maximize an output of thermal energy when the electrified vehicle 90 is charging from the external power source.

The thermal energy generated from the heating layer 34 then removes meltable contaminants from the wheel well area 10, or inhibits meltable contaminants from building up within the wheel well area 10.

The method 300 then ends at a step 326. The method 300 could move from the step 322 to the step 326 in response to expiration of a threshold amount of time, data from the capacitive sensor indicating that no meltable contaminants are within the wheel well area, completion of a charge of the traction battery, or some combination of these.

If, at the step 318, the method 300 detects that the electrified vehicle 90 is not being charged from an external power source, the method moves to a step 330. At the step 330, the method 300 assesses a proximity of the electrified vehicle 90 to a charging station, such as the charging station 98.

If the electrified vehicle 90 is within a threshold distance, say five miles, from a charging station, the method 300 progresses to a step 334 where the electrified vehicle 90 is moved to the nearby charging station. The movement of the electrified vehicle 90 to the nearby charging station could be automatic if the electrified vehicle 90 is an autonomous, driverless vehicle. The movement of the electrified vehicle 90 to the nearby charging station could be initiated by a driver of the electrified vehicle 90 if the electrified vehicle 90 is a not an autonomous vehicle. In such an example, the method 300 could display a message to the driver prompting the driver to move to the nearby charging station to remove meltable contaminants from the wheel well area 10. After moving to the nearby charging station, the electrified vehicle 90 is charged and the method 300 moves to the step 318.

If the electrified vehicle 90 is not within the threshold distance from an external charging station, the method 300 progresses to a step 338 where the controller module 78 activates the heating layer 34 to remove meltable contaminates, but controls the activation to conserve power. The step 338 takes steps to remove the meltable contaminants, but does not, in this exemplary embodiment, risk draining the traction battery 94 such that the electrified vehicle 90 can no longer be driven.

The step 338 could involve applying powering the heating layer 34 with an amount of power P calculated according to a formula where $P=K*(D-D_{min})$. In the exemplary formula, D represents an estimate of a thickness of the meltable contaminants within the wheel well area 10. Measurements from the capacitive sensors can be used, for example, to estimate the thickness. $D_{min}$ represents a minimum threshold for the thickness. The minimum thickness could be, for example, a thickness that will not cause the wheel 26 to contact the meltable contaminants during driving operations of the electrified vehicle 90. K represents a current state of charge of the traction battery 94, a time remaining on a current ride, a time available for charging at the conclusion of the current ride, or some combination of these. Powering the heating layer 34 in the step 338 can balance power distribution to the heating layer 34 to provide thermal energy while ensuring that the traction battery 94 maintains enough power to propel the electrified vehicle 90.

After the step 338, the method 100 ends at a step 342.

The method 300 can differentiate between the form of moisture (i.e., differentiate rain from ice and snow) using capacitance measurements. In response, the heating layer 34 of the extruded heater assembly 18 can be activated when ice, snow, or both build up within the wheel well area 10, and not every time the wheel well area 10 is exposed to moisture. This is particularly useful for the electrified vehicle 90 and autonomous vehicles, as range and power resources for such vehicles can be constrained.

The method 300 prioritizes using the heating layer 34 of the extruded heater assembly 18 to generate thermal energy when the electrified vehicle 90 is charging from the external power source. During such charging, power from the external power source can be used to power the heating layer 34. Thus, a state of charge of the traction battery 94 is not lowered due to powering the heating layer 34.

The method 100 can using the heating layer 34 of the extruded heater assembly 18 to generate thermal energy and warm the wheel well area 10 even when no buildup of meltable contaminants is detected. Warming the wheel well area 10 in this way is particularly appropriate when conditions, such as temperature and moisture content, are conducive to ice and snow building up within the wheel well area 10.

Thermal energy from the warming can then remain in the extruded heater assembly 18, particularly within the insulative layer 42 of the backing 30 after the electrified vehicle 90 has stopped charging and driven away from the external power source. The thermal energy stored within the extruded heater assembly 18 can inhibit meltable contaminates from building up within the wheel well area 10.

When electrified vehicle 90 is driving with no charging available, the method 300 can activate the heating layer 34 of the extruded heater assembly 18 while taking into account various parameters to avoid draining a charge of the traction battery 94 below a desired level. Example parameters factored in to the activation of the heating layer 34 during driving can include an estimated thickness of a buildup within the wheel well area 10, a speed of the electrified vehicle 90, a detected temperature of the wheel well area 10, availability of charging (and time to do so) before next ride. Taking at least some of these parameters into account when activating the heating layer 34 can help to optimize a trade-off between avoiding a buildup of meltable contaminants while maintaining sufficient power levels within the traction battery 94 to power the electrified vehicle 90.

Features of the disclosed examples include a heater assembly for a wheel well area of a vehicle that can be extruded and, optionally, thermoformed. Materials of the heater assembly are selected to facilitate extrusion and thermoforming. The vehicle can be a conventional vehicle, or an electrified vehicle. The vehicle can be an autonomous vehicle.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An extruded heater assembly, comprising:
   a backing;
   a heating layer having a conductive ink printed on a film; and
   a wear layer, the heating layer sandwiched between the backing and the wear layer, wherein the conductive ink printed on the film comprises a capacitive portion printed on the film that provides a portion of a capacitive circuit, and a heating portion printed on the film that provides a portion of a heating circuit.

2. The extruded heater assembly of claim 1, wherein the backing, the heating layer, and the wear layer are portions of a single extruded structure.

3. The extruded heater assembly of claim 2, wherein the single extruded structure is thermoformed into a shape corresponding to a wheel well.

4. The extruded heater assembly of claim 1, further comprising a vehicle, the backing secured directly to a vehicle body of the vehicle such that the extruded heater assembly is disposed within a wheel well area and extends circumferentially about a portion of a wheel.

5. The extruded heater assembly of claim 1, wherein the backing includes an insulative layer and a thermally conductive layer, the thermally conductive layer sandwiched between the insulative layer and the heating layer.

6. The extruded heater assembly of claim 5, wherein the insulative layer and the thermally conductive layer both comprise a polyester material.

7. The extruded heater assembly of claim 6, wherein the insulative layer comprises a glass additive, and the thermally conductive layer comprises both a carbon additive and a graphite additive.

8. The extruded heater assembly of claim 1, wherein the conductive ink is printed on a first side of the film, and the wear layer is disposed adjacent an opposite, second side of the film.

9. The extruded heater assembly of claim 1, wherein the heating layer projects laterally past both the backing and the wear layer.

10. A method, comprising:
    extruding together a backing, a heating layer having a conductive ink printed on a film, and a wear layer to provide an extruded structure;
    mounting the extruded structure within a wheel well area of a vehicle; and
    printing the conductive ink on a first side of the film, and extruding the wear layer adjacent an opposite, second side of the film,
    wherein some of the conductive ink is within a first circuit and is configured to activate to heat the wheel well area,
    wherein some of the conductive ink is within a second circuit and is configured to activate to detect a buildup of contaminants in the wheel well area.

11. The method of claim 10, wherein the heating layer is sandwiched between the backing and the wear layer.

12. The method of claim 10, further comprising thermoforming the extruded structure prior to the mounting.

13. The method of claim 12, wherein the thermoforming includes shaping the extruded structure about a mold to establish a contour within the extruded structure, the contour corresponding to a shape of the wheel well area.

14. The method of claim 10, further comprising activating the conductive ink to heat the wheel well area.

15. The method of claim 10, further comprising activating the conductive ink within the first circuit to heat the wheel well area and activating the conductive ink within the second circuit to detect a buildup of contaminants in the wheel well area.

16. The method of claim 10, wherein a portion of the heating layer projects laterally past both the backing and the wear layer.

17. The method of claim 16, further comprising electrically connecting a power supply to the portion of the heating layer.

18. The method of claim 10, wherein the vehicle is an electrified vehicle.

19. The extruded heater assembly of claim 1, further comprising the film and the conductive ink of the heating layer, the film and the conductive ink separate and distinct from the backing.

20. The extruded heater assembly of claim 19, wherein the film is a thermoplastic material, wherein the backing includes an insulative layer and a thermally conductive layer.

* * * * *